United States Patent
Liao

(10) Patent No.: US 9,379,748 B2
(45) Date of Patent: Jun. 28, 2016

(54) INTERFERENCE ADAPTIVE WIDEBAND RECEIVER

(75) Inventor: Jichang Liao, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 69 days.

(21) Appl. No.: 14/358,313

(22) PCT Filed: Nov. 22, 2011

(86) PCT No.: PCT/CN2011/001938
§ 371 (c)(1),
(2), (4) Date: May 15, 2014

(87) PCT Pub. No.: WO2013/075261
PCT Pub. Date: May 30, 2013

(65) Prior Publication Data
US 2014/0323071 A1    Oct. 30, 2014

(51) Int. Cl.
*H04B 1/18* (2006.01)
*H04B 1/10* (2006.01)

(52) U.S. Cl.
CPC ...... *H04B 1/1036* (2013.01); *H04B 2001/1072* (2013.01)

(58) Field of Classification Search
CPC ..................................................... H04L 27/20
USPC ......................................... 455/183.1
See application file for complete search history.

(56) References Cited

U.S. PATENT DOCUMENTS

| 7,155,196 | B1 | 12/2006 | Beard | |
|---|---|---|---|---|
| 7,317,774 | B2 * | 1/2008 | Richey et al. | 375/355 |
| 7,948,782 | B2 * | 5/2011 | Chang et al. | 365/49.17 |
| 2005/0134336 | A1 * | 6/2005 | Goldblatt et al. | 327/156 |
| 2010/0130155 | A1 * | 5/2010 | Khoini-Poorfard et al. | 455/255 |

FOREIGN PATENT DOCUMENTS

| CN | 1742440 A | 3/2006 |
|---|---|---|
| CN | 101277121 A | 10/2008 |
| JP | 2003143025 A | 5/2003 |

OTHER PUBLICATIONS

3rd Generation Partnership Project, "3rd Generation Partnership Project; Technical Specification Group Radio Access Networks; E-UTRA, UTRA and GSM/EDGE; Multi-Standard Radio (MSR) Base Station (BS) radio transmission and reception (Release 10)", Technical Specification, 3GPP TS 37.104 V10.1.0, Dec. 1, 2010, pp. 1-51, 3GPP, France.

3rd Generation Partnership Project, "3rd Generation Partnership Project; Technical Specification Group GSM/EDGE Radio Access Network; Radio transmission and reception (Release 9)", 3GPP TS 45.005 V9.5.0, Nov. 1, 2010, p. 47, 3GPP, France.

* cited by examiner

*Primary Examiner* — Sanh Phu

(74) *Attorney, Agent, or Firm* — Coats & Bennett, P.L.L.C.

(57) ABSTRACT

The invention discloses a wideband receiver and a base station in a communication network. The wideband receiver comprises an Intermediate Frequency (IF) frequency control module, a frequency synthesizer, a mixer and an analog-to-digital converter (ADC). The IF frequency control module comprises an interference detector adapted to detect interference condition on at least one frequency band, and an IF frequency selector adapted to select an IF frequency based on the detected interference condition from the interference detector. The IF frequency is selected to avoid high interference mixed product of the mixer occurring in used channel. The frequency synthesizer generates an oscillator signal of the selected IF frequency, the mixer down converts a RF signal to an IF signal using the oscillator signal of the selected IF frequency, and the ADC converts the IF signal to baseband data.

9 Claims, 2 Drawing Sheets

INTERFERENCE ADAPTIVE WIDEBAND RECEIVER

TECHNICAL FIELD

The present invention generally relates to wireless communication, particularly to an interference adaptive wideband receiver in a wireless communication network.

BACKGROUND

In a receiver used in a wireless communication system, a Radio Frequency (RF) signal is typically received and down converted to a baseband signal before being decoded.

FIG. 1 is a schematic block view of an existing wideband receiver architecture. The receiver 100 usually includes an antenna 110 which receives a RF signal, an antenna Filter Unit (FU) 120 which filters out outband blocking signal from the received RF signal and a Low-Noise Amplifier (LNA) 130 which amplifies the RF signal with a low Noise Figure (NF). The amplified RF signal is then input to a down-conversion portion (as shown on the right side of the dotted line) for converting the RF signal to base band data. A mixer 140 multiplies the RF signal by an oscillator signal of an Intermediate Frequency (IF) frequency generated by a frequency synthesizer 150 to down-convert the RF signal to an IF signal. The IF signal then passes a Band Pass Filter (BPF) 160 such as an IF saw filter, an image filter and an Anti-alias (AA) filter, and is amplified by another LNA 170. Finally an Analog-to-Digital Converter (ADC) 180 converts the IF signal to baseband data for further processing by e.g. Digital Signal Processor (DSP) devices.

Today, with development of wireless communication technology and increasing demand of higher data rate, the required transmission bandwidth is increasing dramatically. In consequence, the In-channel BandWidth (IBW) requirement for the receiver becomes higher. For example, a multi-carrier architecture has been widely used in designing the receiver, in order to satisfy the IBW requirement without increasing complexity of the receiver. At the same time, due to the rapid deployment of various communication nodes, the electromagnetism environment is becoming more and more complex, which raises the requirement for receiver blocking performance. Especially, the dynamic range of the mixer and ADC needs to be large, and the rejection performance of the antenna filter needs to be high. The requirement is even higher in case of a Multi-Stand Receiver (MSR) which is capable of operating in different frequency bands for different communication standards.

For example, for a MSR BC2 receiver, for −25 dBm in band blocking signal, offset from 800 KHz to 1.6 MHz blocking, if we consider a 3 dB receiver chain NF and 8 dB sensitivity degradation (refer to, e.g. 3GPP TS 37.104 V10.1.0 and 3GPP TS 45.005 V9.5.0), the selectivity requirement will be about 84 dB. The ADC Spurious Free Dynamic Range (SFDR) needs to be larger than 90 dBFS, which is a very high requirement. For outband blocking, if we consider a co-location situation in which the Continuous Wave (CW) blocking level is 16 dBm, in order to make the sensitivity degrade less than 0.1 dB for a Global System Mobile (GSM) system, the selectivity should be larger than 150 dB which is also a very high requirement. Filters need to contribute a lot to rejection in the positions where large blocking signals occurs and can not be efficiently suppressed by the Rx circuit. The high requirement for these components makes the product expensive and bulky.

SUMMARY

Therefore, it is an object to solve at least one of the above-mentioned problems.

According to an aspect of the invention, a wideband receiver in a communication network is provided. The wideband receiver comprises an Intermediate Frequency (IF) frequency control module, a frequency synthesizer, a mixer and an analog-to-digital converter (ADC). The IF frequency control module comprises an interference detector adapted to detect interference condition on at least one frequency band, and an IF frequency selector adapted to select an IF frequency based on the detected interference condition from the interference detector. The IF frequency selector may be further adapted to select the IF frequency to avoid high interference mixed product of the mixer occurring in used channel. The frequency synthesizer is adapted to generate an oscillator signal of the selected IF frequency, the mixer is adapted to down convert a RF signal to an IF signal using the oscillator signal of the selected IF frequency, and the ADC is adapted to convert the IF signal to baseband data.

The IF frequency control module may further comprise a Look-Up Table (LUT) storing candidate IF frequencies for different interference conditions. The interference selector may be further adapted to retrieve the IF frequency from the LUT.

The LUT may further store candidate injection mode of the mixer for different interference conditions. The interference selector may be further adapted to retrieve the injection mode of the mixer from the LUT, and the mixer is further adapted to down convert the RF signal using the oscillator signal of the selected IF frequency and the selected injection mode.

The IF frequency selector may be further adapted to select the IF frequency to avoid high ADC harmonic product occurring in the used channel. The LUT may further store candidate IF frequency offsets for different interference conditions, and the interference selector may be further adapted to retrieve an IF frequency offset from the LUT and offset the retrieved IF frequency by the IF frequency offset.

The interference condition may include interference frequency and power on each of the at least one frequency band. The wideband receiver may further comprise at least one band pass filter adapted to band pass the IF signal using the selected IF as a centre frequency.

According to an aspect of the invention, a base station in a communication network, comprising the wideband receiver as described above is provided.

BRIEF DESCRIPTION OF THE DRAWINGS

The invention will be described in detail by reference to the following drawings, in which.

DETAILED DESCRIPTION

Figure 1:
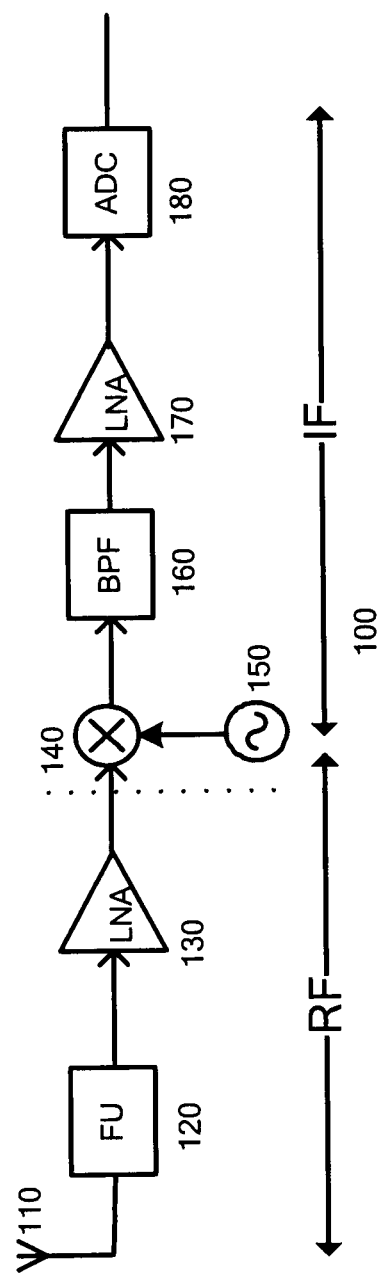
FIG. 1 shows a schematic block view of an existing wideband receiver architecture.

Embodiments of the present invention will be described more fully hereinafter with reference to the accompanying drawings, in which embodiments of the invention are shown. This invention may, however, be embodied in many different forms and should not be construed as limited to the embodiments set forth herein. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Embodiments of the invention will be described below with reference to the drawings.

Although a wideband receiver is designed to suppress all the potential interferences throughout its wide operating frequency band, generally only a few interferences that may substantially influence the performance of the receiver simultaneously exist in real environment. It is proposed to detect the interference condition in real environment and dynamically control the IF frequency of the oscillator signal in the receiver based on the detection result so as to suppress the influence of the interferences.

Figure 2:
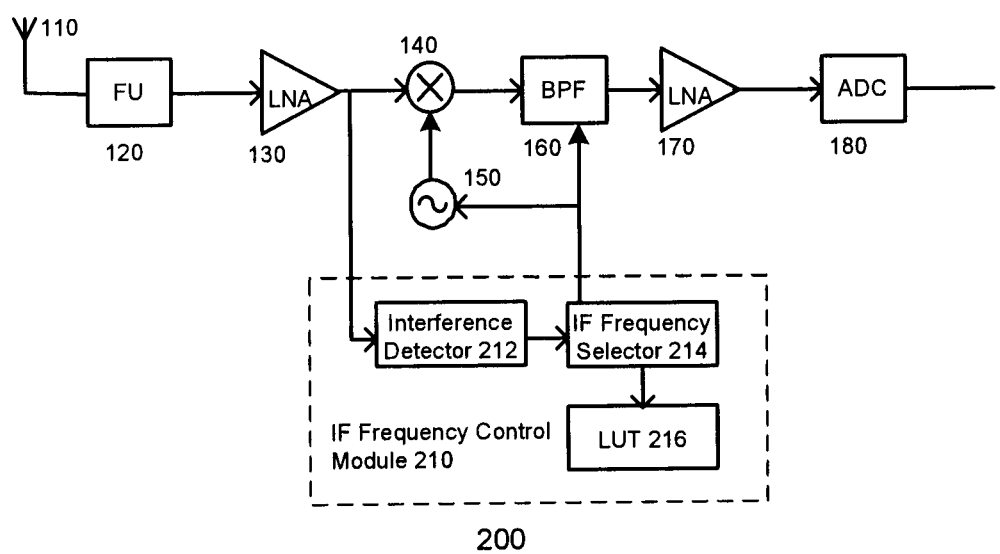
FIG. 2 shows a schematic block view of a wideband receiver architecture in accordance with an embodiment of the invention

FIG. 2 shows a schematic block view of a wideband receiver architecture in accordance with an embodiment of the invention.

As shown in FIG. 2, the wideband receiver 200 includes an IF frequency control module 210, in addition to the components which are usually included and already depicted in FIG. 1. The IF frequency control module 210 may include an interference detector 212 and an IF frequency selector 214.

The interference detector 212 detects interference condition on at least one frequency band, for example, on all or part of the frequency bands on which the receiver is capable of operating. In an exemplary embodiment, the interference detector 212 may include a homodyne receiver (not shown) comprising a demodulator, a Low Pass Filter (LPF) and an ADC. Interference signals occurring on the at least one frequency band are demodulated by the demodulator, LPF filtered by the LPF and converted to baseband data by the ADC. The interference detector 212 may scan the at least one frequency band to search the interference signals, e.g. by tuning the operating frequency of the homodyne receiver. Thus the interference detector can easily obtain (e.g. by using a DSP) the interference condition, including e.g. interference frequency and power on each of at least one frequency band. In order to simply the implementation, only large interference signals such as those larger than −60 dBm may be detected. The scanning speed should be fast if the concerned frequency bands are in a wide range (e.g. over 500 MHz). The demodulator may use a local oscillator with a high switching speed to facilitate the fast scanning.

The IF frequency selector 214 selects an IF frequency based on the detected interference condition from the interference detector 212. Typically the interference signals influence the performance of the receiver in two aspects. When multiplied by the oscillator signal in the mixer 140, the interference signals which are not sufficiently filtered out from the received RF signals will generate a high interference mixed product in the frequency domain. In case that the high interference mixed product occurs in used channel, useful signals potentially received in the used channel will be deteriorated. In addition, when passing through the ADC 180, interference signals may cause a high ADC harmonic product occurring in the used channel in the frequency domain. The positions of both the interference mixed product and ADC harmonic product occur in the frequency domain are related to the IF frequency.

The IF frequency selector 214 may select a suitable IF frequency to move the products as caused by the interference signals outside the used channel so that they will not deteriorated the useful signals potentially received in the used channel. In an embodiment, the IF frequency is selected to avoid high interference mixed product of the mixer 140 occurring in the used channel. In another embodiment, the IF frequency selector 214 may further select the IF frequency to avoid high ADC harmonic product occurring in the used channel. Given the parameters of the mixer and ADC as well as the frequency and power of the interferences are known, the interference mixed product and ADC harmonic product under a specific IF frequency can be calculated. There are various means to select a suitable IF frequency. In an embodiment, the IF frequency selector 214 may calculate in real time the interference mixed product and ADC harmonic product for a IF frequency the mixer is currently using, and determine if either of them has a high value in the used channel. For example, the interference mixed product or ADC harmonic product may be considered as high if it exceeds a threshold which depends on the design requirement of the receiver. If yes, the IF frequency selector 214 may calculate the interference mixed product and ADC harmonic product for other IF frequencies and select one IF frequency for which no high interference mixed product or ADC harmonic product occurs in the used channel. In another embodiment, the IF frequency selector 214 may use one or more Look-Up Table (LUT) pre-stored in the IF frequency control module 210 for a simple and fast selection.

As shown in FIG. 2, the IF frequency control module 210 includes a LUT 216. The LUT 216 stores candidate IF frequencies for different interference conditions. The interference selector 214 may retrieve the IF frequency from the LUT 216 using the detected interference condition as input. The candidate IF frequencies are verified in advance for the specific receiver to guarantee that no high interference mixed product of the mixer 140 for the corresponding interference conditions will occur in the used channel. For example, the LUT 216 can be obtained from experimental data. We can test a number of IF frequencies for an interference condition and monitor the interference mixed products of the mixer when they pass the mixer. Then the IF frequency which causes the lowest interference mixed product of the mixer in the used channel can be stored into the LUT 216 in association with that interference condition. As an alternative, the LUT 216 may be obtained from calculation or simulation. For a specific interfere condition such as interference frequency and power, it is possible to calculate the mixer order mapping to different IF frequencies. Then we can select a reference power and calculate e.g. a Delta to the reference power by (Mixer order) *(interference power−reference power). The IF frequency whose mixer order has the highest Delta value can be stored into the LUT 216 in association with that interference condition.

The LUT 216 may further store candidate injection mode of the mixer for different interference conditions. The injection mode typically includes high injection mode and low injection mode. The interference selector 214 may retrieve the injection mode of the mixer from the LUT 216, and the mixer 140 may down convert the RF signal using the oscillator signal of the selected IF frequency and the selected injection mode.

In addition to the interference mixed product of the mixer, the IF frequency selector 214 may also take into account the ADC harmonic product when selecting the IF frequency. The IF frequency is preferably selected to also avoid high ADC harmonic product occurring in the used channel. In the above example, the ADC harmonic product may be taken into account when determining the candidate IF frequencies in the LUT 216, that is, the candidate IF frequencies stored in the LUT 216 will not cause high interference mixed product or ADC harmonic product in the used channel for the corresponding interference conditions. As an alternative, the LUT 216 may additionally store candidate IF frequency offsets for different interference conditions, and the interference selector 214 may retrieve an IF frequency offset from the LUT 216 and offset the retrieved IF frequency by the IF frequency offset to avoid high ADC harmonic product occurring in the used channel.

Once the suitable IF frequency is selected for the detected interference condition, the IF frequency control module 210 controls the frequency synthesizer 150 to generate an oscillator signal of the selected IF frequency. The frequency synthesize 150 may tune to the new IF frequency by, e.g. using tunable resistor/inductance/capacitance components or multiple IF braches and RF switch. The mixer 140 then operates on the selected IF frequency which will not cause high interference mixed product or high ADC harmonic product in the used channel for the detected interference condition. The IF frequency control module 210 may further control the mixer 140 to operate in the selected injection mode. In addition, the IF frequency control module 210 may output the selected IF frequency to the BPF 160 and the BPF 160 may band pass the IF signal using the selected IF as a centre frequency.

By detecting the real-time interference condition and adaptively selecting the proper IF frequency of the oscillator signal, as well as the centre frequency of the BPF, the wideband receiver performance can be optimized for the real environment. In another aspect, the requirement for the components in the receiver, including the dynamic range of the mixer and ADC and the rejection performance of the antenna filter, is lowered. Even if these components can not satisfactorily suppress the significant interferences, the receiver performance will not be seriously deteriorated by these interferences thanks to the proper selection of the IF frequency. The cost and size of the components will consequently be reduced. Moreover, the detected inference condition on the wide range of frequency bands may be reported to the network side to facilitate other operations such as scheduling.

Although the invention is described above with reference to an embodiment of a single-stage down-conversion circuitry in which only one mixer is used, it should be understood that it can be applied to a receiver with a two-stage or more stage down-conversion circuitry in which two or more mixers are used. For example, in the two-stage down-conversion circuitry, the RF signal is down converted twice by two mixers using two oscillator signals of two different IF frequencies. In this case, the two IF frequencies may be properly selected for the detected interference condition, e.g. by using two LUTs, in order to avoid high interference mixed product or high ADC harmonic product in the used channel. The wideband receivers under embodiments of this invention can be used in a base station, and can also be used in other nodes or devices.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from its central scope. Therefore it is intended that the present invention not be limited to the particular embodiment disclosed as the best mode contemplated for carrying out the present invention, but that the present invention include all embodiments falling within the scope of the appended claims.

The invention claimed is:

1. A wideband receiver in a communication network, the wideband receiver comprising:
    an Intermediate Frequency (IF) frequency control circuit, comprising:
        an interference detector configured to detect an interference condition of a received radio frequency (RF) signal on at least one frequency band;
        an IF frequency selector configured to select an IF frequency based on the interference condition detected by the interference detector;
    a frequency synthesizer configured to generate an oscillator signal of the selected IF frequency;
    a mixer configured to down-convert the RF signal to an IF signal using the oscillator signal; and
    an analog-to-digital converter configured to convert the IF signal to baseband data.

2. The wideband receiver of claim 1, wherein the IF frequency selector is further configured to select the IF frequency to avoid high interference mixed products of the mixer occurring in a channel that is used.

3. The wideband receiver of claim 2, wherein:
    the IF frequency control circuit further comprises a Look-Up Table (LUT) storing candidate IF frequencies for different interference conditions;
    the IF frequency selector is further configured to retrieve the IF frequency from the LUT.

4. The wideband receiver of claim 3, wherein:
    the LUT further stores candidate injection modes of the mixer for different interference conditions;
    the IF frequency selector is further configured to select an injection mode of the mixer from the LUT; and the mixer is further configured to down-convert the RF signal using the oscillator signal of the selected IF frequency and the selected injection mode.

5. The wideband receiver of claim 2, wherein the IF frequency selector is further configured to select the IF frequency to avoid high analog-to-digital harmonic products occurring in the channel that is used.

6. The wideband receiver of claim 5, wherein:

a Look-Up Table (LUT) further stores candidate IF frequency offsets for different interference conditions; and the IF frequency selector is further configured to retrieve an IF frequency offset from the LUT and offset the IF frequency by the IF frequency offset.

7. The wideband receiver of claim 1, wherein the interference condition includes interference frequency and power on each of the at least one frequency band.

8. The wideband receiver of claim 1, further comprising at least one band pass filter configured to band pass the IF signal using the selected IF frequency as a center frequency.

9. The wideband receiver of claim 1, wherein the wideband receiver comprises a portion of a base station in a communication network.

* * * * *